US008384493B2

(12) United States Patent
Sertel et al.

(10) Patent No.: US 8,384,493 B2

(45) Date of Patent: Feb. 26, 2013

(54) EMULATION OF ANISOTROPIC MEDIA IN TRANSMISSION LINE

(75) Inventors: Kubilay Sertel, Columbus, OH (US); John L. Volakis, Columbus, OH (US)

(73) Assignee: The Ohio State University Research Foundation, Columbus, OH (US)

(*) Notice: Subject to any disclaimer, the term of this patent is extended or adjusted under 35 U.S.C. 154(b) by 950 days.

(21) Appl. No.: 12/307,333

(22) PCT Filed: Jul. 6, 2007

(86) PCT No.: PCT/US2007/072991

§ 371 (c)(1), (2), (4) Date: Jan. 6, 2009

(87) PCT Pub. No.: WO2008/006089

PCT Pub. Date: Jan. 10, 2008

(65) Prior Publication Data

US 2009/0315634 A1 Dec. 24, 2009

Related U.S. Application Data

(60) Provisional application No. 60/806,632, filed on Jul. 6, 2006.

(51) Int. Cl.

*H01P 5/18* (2006.01)

*G02B 5/26* (2006.01)

(52) U.S. Cl. .......................... 333/109; 333/204; 385/43

(58) Field of Classification Search .................. 333/238, 333/115, 116, 246, 204, 161, 24 R, 109; 343/700 MS, 824, 853, 893; 359/237; 703/23; 385/42, 385/43

See application file for complete search history.

(56) References Cited

U.S. PATENT DOCUMENTS 3,480,884 A * 11/1969 Metcalf ........................ 333/116

(Continued)

FOREIGN PATENT DOCUMENTS

EP 0456212 A2 11/1991

JP 55-27746 A 2/1980

(Continued)

OTHER PUBLICATIONS

Alu, A. et al., Pairing an Epsilon-Negative Slab With a Mu-Negative Slab: Resonance, Tunneling and Transparency, IEEE Transactions on Antennas and Propagation, Oct. 2003, pp. 2558-2571, vol. 51, No. 10.

(Continued)

*Primary Examiner* — Dean O Takaoka

*Assistant Examiner* — Alan Wong

(74) *Attorney, Agent, or Firm* — Standley Law Group LLP

(57) ABSTRACT

In one exemplary embodiment, a transmission line geometry or structure may readily be realized as periodic printed coupled/uncoupled microstrip lines on dielectric and/or suitable biased ferromagnetic substrates. An example of a transmission line geometry or structure may be adapted to emulate extraordinary propagation modes within bulk periodic assemblies of anisotropic dielectric and magnetic materials. For instance, wave propagation in anisotropic media may be emulated by using a pair of coupled transmission lines (30, 32) having a specially designed geometry, thereby enabling mold wave dispersion in a microwave or optical guided wave structure. Degenerate band edge resonances, frozen modes, other extraordinary modes, and other unique electromagnetic properties such as negative refraction index may be realized using unique geometrical arrangements that may, for example, be easily manufactured using contemporary RF or photonics/solid state technology.

39 Claims, 16 Drawing Sheets

U.S. PATENT DOCUMENTS

| | | | | |
|---|---|---|---|---|
| 4,394,630 | A * | 7/1983 | Kenyon et al. | 333/116 |
| 4,423,392 | A * | 12/1983 | Wolfson | 333/116 |
| 4,689,584 | A | 8/1987 | Sequeira | |
| 5,138,287 | A | 8/1992 | Domokos et al. | |
| 5,243,305 | A * | 9/1993 | D'Oro et al. | 333/116 |
| 6,392,503 | B1 * | 5/2002 | Thornton | 333/116 |
| 6,549,089 | B2 | 4/2003 | Ashoka | |
| 6,701,048 | B2 | 3/2004 | Figotin et al. | |
| 7,132,906 | B2 * | 11/2006 | Podell | 333/109 |
| 7,248,129 | B2 * | 7/2007 | Hubert | 333/109 |
| 2002/0027481 | A1 * | 3/2002 | Fiedziuszko | 333/116 |
| 2004/0066251 | A1 | 4/2004 | Eleftheriades et al. | |

FOREIGN PATENT DOCUMENTS

JP 2003-179413 A 6/2003

OTHER PUBLICATIONS

Balmain, K.G. et al, Power Flow for Resonance Cone Phenomena in Planar Anisotropic Metamaterials, IEEE Transactions on Antennas and Propagation, Oct. 2003, pp. 2612-2618, vol. 51, No. 10.

Chappell, W.J. et al., Wide Bandgap Composite EBG Substrates, IEEE Transactions on Antennas and Propagation, Oct. 2003, pp. 2744-2750, vol. 51, No. 10.

Clavijo, S. et al., Design Methodology for Sievenpiper High-Impedance Surfaces: An Artificial Magnetic Conductor for Positive Gain Electrically Small Antennas, IEEE Transactions on Antennas and Propagation, Oct. 2003, pp. 2678-2690, vol. 51, No. 10.

De Maagt, P. et al., Electromagnetic Bandgap Antennas and Components for Microwave and (Sub)Millimeter Wave Applications, IEEE Transactions on Antennas and Propagation, Oct. 2003, pp. 2667-2677, vol. 51, No. 10.

Figotin, A. et al., Gigantic transmission band-edge resonance in periodic stacks of anisotropic layers, Physical Review E, 2005, pp. 036619-1-036619-12, vol. 72.

Figotin, A. et al., Nonreciprocal magnetic photonic crystals, Physical Review E, 2001, pp. 066609-1-066609-17, vol. 63.

Enoch, S. et al., The Richness of the Dispersion Relation of Electromagnetic Bandgap Materials, IEEE Transactions on Antennas and Propagation, Oct. 2003, pp. 2659-2666, vol. 51, No. 10.

Grbic, A. et al., Periodic Analysis of a 2-D Negative Refractive Index Transmission Line Structure, IEEE Transactions on Antennas and Propagation, Oct. 2003, pp. 2604-2611, vol. 51, No. 10.

Holloway, C.L. et al., A Double Negative (DNG) Composite Medium Composed of Magnetodielectric Spherical Particles Embedded in a Matrix, IEEE Transactions on Antennas and Propagation, Oct. 2003, pp. 2596-2603, vol. 51, No. 10.

Kirschning, M. et al., Accurate Wide-Range Design Equations for the Frequency-Dependent Characteristic of Parallel Coupled Microstrip Lines, IEEE Transactions on Microwave Theory and Techniques, Jan. 1984, pp. 83-90, vol. MTT-32, No. 1.

Kiziltas, G. et al., Topology Design Optimization of Dielectric Substrates for Bandwidth Improvement of a Patch Antenna, IEEE Transactions on Antennas and Propagation, Oct. 2003, pp. 2732-2743, vol. 51, No. 10.

Kuester, E.F. et al., Averaged Transition Conditions for Electromagnetic Fields at a Metafilm, IEEE Transactions on Antennas and Propagation, Oct. 2003, pp. 2641-2651, vol. 51, No. 10.

Ishimaru, A. et al., Generalized Constitutive Relations for Metamaterials Based on the Quasi-Static Lorentz Theory, IEEE Transactions on Antennas and Propagation, Oct. 2003, pp. 2550-2557, vol. 51, No. 10.

Marques, R. et al., Comparative Analysis of Edge- and Broadside-Coupled Split Ring Resonators for Metamaterial Design-Theory and Experiments, IEEE Transactions on Antennas and Propagation, Oct. 2003, pp. 2572-2581, vol. 51, No. 10.

Mumcu, G. et al., RF Propagation in Finite Thickness Unidirectional Magnetic Photonic Crystals, IEEE Transactions on Antennas and Propagation, Dec. 2005, pp. 4026-4034, vol. 53, No. 12.

Ozbay, E. et al., Transmission and Reflection Properties of Composite Double Negative Metamaterials in Free Space, IEEE Transactions on Antennas and Propagation, Oct. 2003, pp. 2592-2595, vol. 51, No. 10.

Shelby, R.A. et al., Experimental Verification of a Negative Index of Refraction, Science, Apr. 6, 2001, pp. 77-79, vol. 292.

Siddiqui, O.F. et al., Periodically Loaded Transmission Line With Effective Negative Refractive Index and Negative Group Velocity, IEEE Transactions on Antennas and Propagation, Oct. 2003, pp. 2619-2625, vol. 51, No. 10.

Sievenpiper, D.F., et al., Two-Dimensional Beam Steering Using an Electrically Tunable Impedance Surface, IEEE Transactions on Antennas and Propagation, Oct. 2003, pp. 2713-2722, vol. 51, No. 10.

Simovski, C.R. et al., Backward Wave Region and Negative Material Parameters of a Structure Formed by Lattices of Wires and Split-Ring Resonators, IEEE Transactions on Antennas and Propagation, Oct. 2003, pp. 2582-2591, vol. 51, No. 10.

Skobelev, S.P. et al., Analysis of Conical Quasi-TEM Horn With a Hard Corrugated Section, IEEE Transactions on Antennas and Propagation, Oct. 2003, pp. 2723-2731, vol. 51, No. 10.

Tretyakov, S.A., et al., An Analytical Model of Metamaterials Based on Loaded Wire Dipoles, IEEE Transactions on Antennas and Propagation, Oct. 2003, pp. 2652-2658, vol. 51, No. 10.

Yang, F. et al., Reflection Phase Characterization of the EBG Ground Plane for Low Profile Wire Antenna Applications, IEEE Transactions on Antennas and Propagation, Oct. 2003, pp. 2691-2703, vol. 51, No. 10.

Zhang, Y. et al., Planar Artificial Magnetic Conductors and Patch Antennas, IEEE Transactions on Antennas and Propagation, Oct. 2003, pp. 2704-2712, vol. 51, No. 10.

Ziolkowski, R.W. et al., Application of Double Negative Materials to Increase the Power Radiated by Electrically Small Antennas, IEEE Transactions on Antennas and Propagation, Oct. 2003, pp. 2626-2640, vol. 51, No. 10.

Ziolkowski, R.W. et al., Metamaterial Special Issue Introduction, IEEE Transactions on Antennas and Propagation, Oct. 2003, pp. 2546-2549, vol. 51, No. 10.

Caloz, C. et al., Electromagnetic Metamaterials: Transmission Line Theory and Microwave Applications, 2005, pp. 118-131, Wiley-IEEE Press.

Collin, R.E., Field Theory of Guided Waves, 1960, pp. 605-627, McGraw-Hill.

Collin, R.E., Foundations for Microwave Engineering, 2001, pp. 248-261, 2nd edition, McGraw-Hill International Editions.

Eleftheriades, G.C. et al., Negative-Refraction Metamaterials, 2005, pp. 20-29, IEEE Press, John Wiley & Sons.

Mumcu, G. et al., Superdirective Miniature Antennas Embedded Within Magnetic Photonic Crystals, IEEE Antennas and Propagation Society Symposium, 2005, pp. 10-13.

Okubo, K. et al., On The Left Handed Ferrite Circulator, IEEE Microwave Symposium Digest, 2006, pp. 548-551, Jun. 11-16, 2006.

Yarga, S. et al., Degenerate Band Edge Crystals and Periodic Assemblies for Antenna Gain Enhancement, IEEE Antenna Technology Small Antennas and Novel Metamaterials, 2006, pp. 408-411, Mar. 6-8, 2006.

* cited by examiner

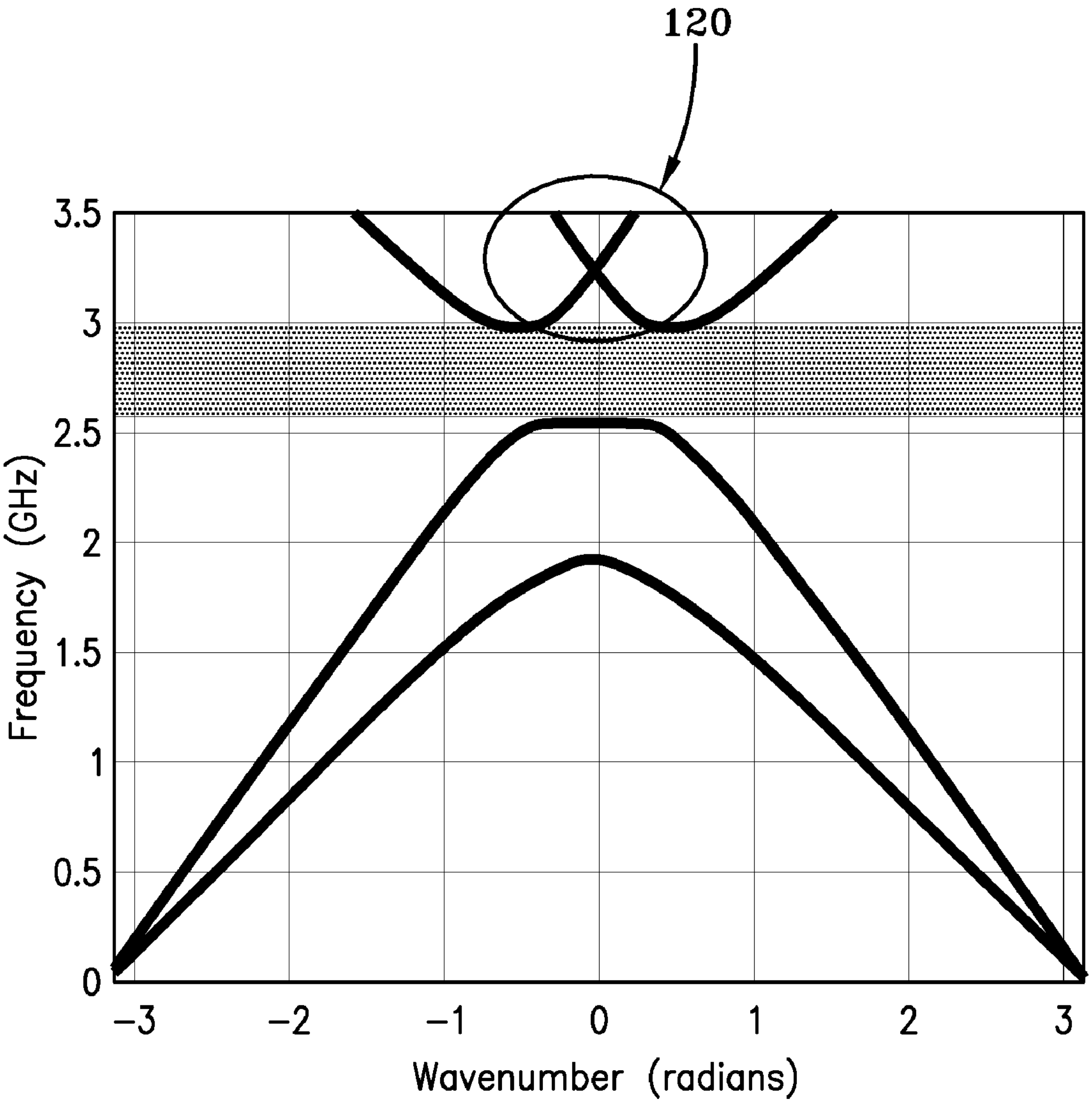
FIG−12

EMULATION OF ANISOTROPIC MEDIA IN TRANSMISSION LINE

This application claims priority to U.S. Provisional Application No. 60/806,632, filed Jul. 6, 2006, which is hereby incorporated by reference in its entirety.

BACKGROUND AND SUMMARY OF THE INVENTION

Periodic assemblies of materials have been shown to have unique and useful properties for microwave and optics applications. Examples of these are the photonic and microwave band gap structures, the left handed materials (LHM), and other related periodic assemblies. Such periodic media have allowed for several practical microwave components such as delay lines, couplers, and antennas.

In addition to band gap structures, other periodic structures offer unique and extraordinary properties. Among them, the magnetic photonic crystals (MPC) and their related "cousins" degenerate band edge (DBE) structures have been shown to lead to significant wave slow down and amplitude increase within a small region. These crystals have therefore been found very attractive for miniature and highly sensitive antennas and possibly miniature microwave devices. However, their anisotropic nature makes their fabrication extremely challenging and costly. Thus, there is a need to be able to emulate the MPC, DBE, and other electromagnetic properties and extraordinary modes as well as wave dispersion in such media using printed circuit technology, which would provide a significant step in making low cost, high performance devices based on MPC and DBE modes.

One exemplary embodiment of the present invention is novel coupled microstrip lines which may, for example, emulate propagation through an anisotropic medium such as MPC or DBE crystal. For example, a coupled microstrip line geometry may mimic the layered anisotropic medium making-up DBE or MPC crystals. In particular, one exemplary embodiment of the present invention may be comprised of coupled and uncoupled microstrip transmission line (TL) segments whose scattering parameter matrix (when cascaded) may form a periodic printed circuit that is adapted to deliver the band diagram of (or equivalently wave dispersion in) DBE or MPC crystals. Although some exemplary embodiments of the present invention may be particularly useful for MPC or DBE modes, it should be recognized that other extraordinary modes and electromagnetic properties may be achieved in various embodiments of the present invention.

In one exemplary embodiment, microstrip transmission line structures for a new class of photonic crystals may emulate degenerate band edge (DBE) and frozen mode behaviors in magnetic photonic crystals (MPC). For example, a microstrip line model may be formed from at least a pair of coupled and uncoupled lines adapted to emulate wave propagation within a bulk anisotropic layered medium. Wave dispersion within such periodic microstrip structures may support DBE and MPC modes for specific geometrical designs that can, for example, be readily manufactured using standard RF printed circuit techniques. Furthermore, in some exemplary embodiments of the present invention, manufacturing the printings on a ferrite substrate may allow for the realization of frozen modes as in MPC assemblies.

An exemplary embodiment of the present invention is the first time that microwave transmission line components may be used to emulate the extraordinary propagation phemomena encountered in periodic assemblies of bulk anisotropic dielectric and gyromagnetic ferrite materials. Further, the simplicity of an exemplary embodiment of printed microwave transmission lines together with mature circuit optimization tools allows for generating extremely fast and efficient designs of metamaterials displaying the aforementioned extraordinary modes as well as other unique electromagnetic properties, such as negative refraction index. Other benefits are also possible. An exemplary embodiment of a coupled transmission line layout can also be manufactured using solid state coupled optical fibers/channels and make use of gyroelectric and gyromagnetic behaviour of semiconductors to replace ferromagnetic substrates, thereby allowing for the realization of guided frozen light modes.

In addition to the novel features and advantages mentioned above, other benefits will be readily apparent from the following descriptions of the drawings and exemplary embodiments.

BRIEF DESCRIPTION OF THE DRAWINGS

FIG. 12 is an example of a dispersion diagram of a DBE microstrip geometry indicating frequency region and eigenmode branches that display negative refraction index.

DETAILED DESCRIPTION OF EXEMPLARY EMBODIMENT(S)

Figure 1:
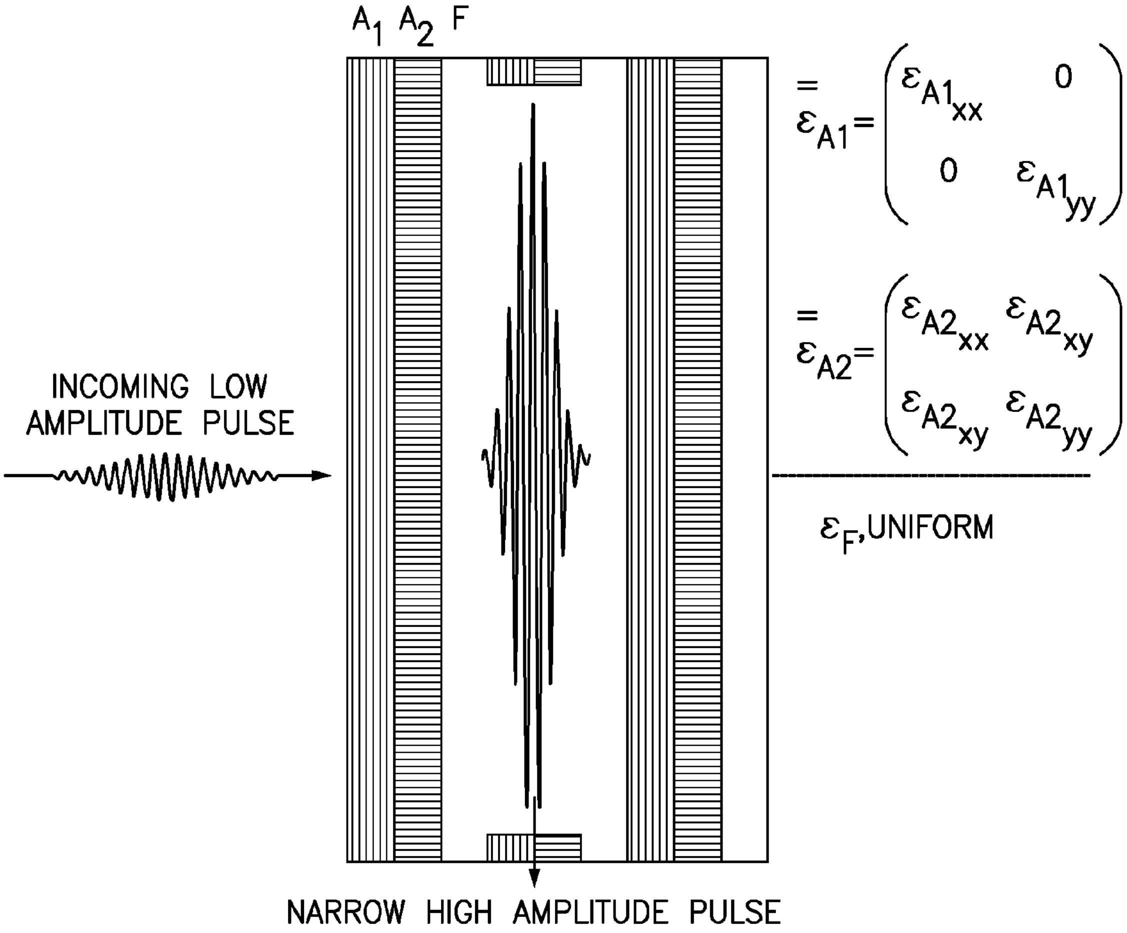
FIG. 1 is a schematic diagram of energy propagation through DBE crystal assembled from a set of anisotropic dielectric ($A_1$, $A_2$) and isotropic (F) layers.
Figure 2:
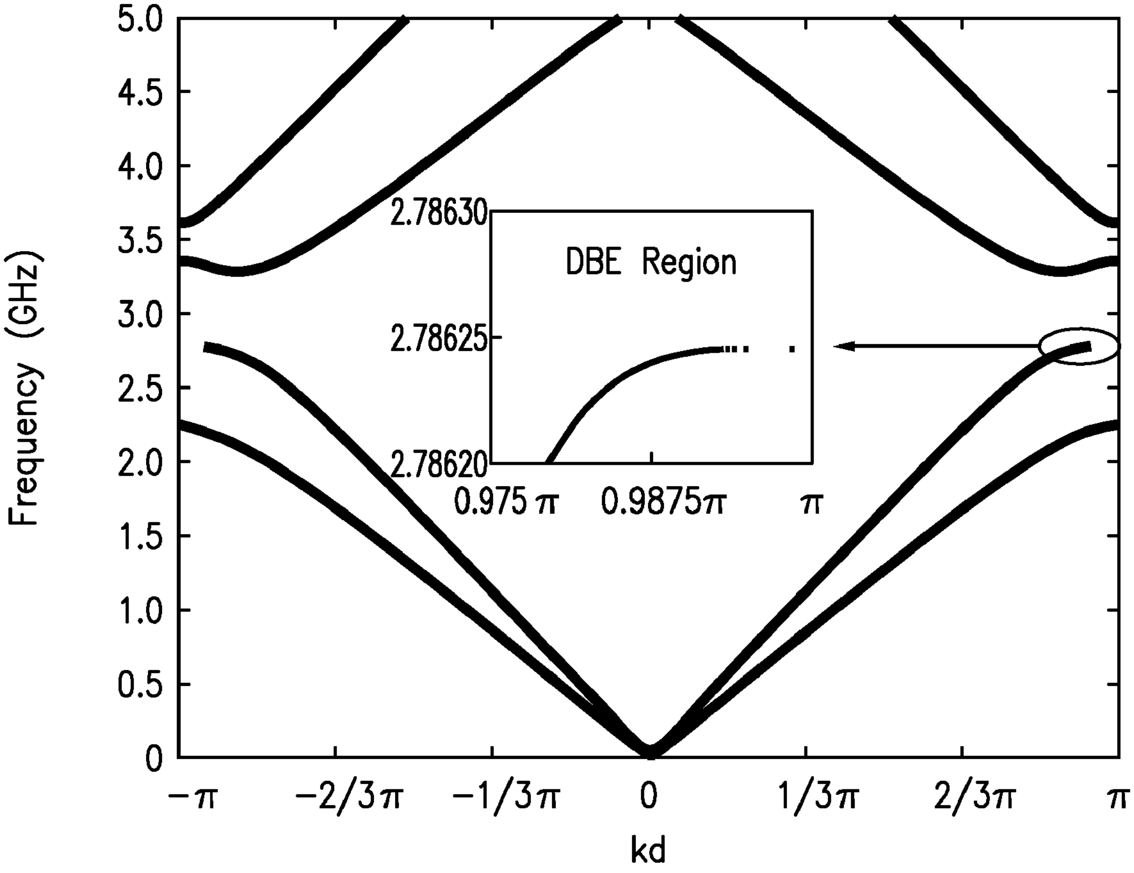
FIG. 2 is an example of a dispersion diagram of the DBE crystal in FIG. 1.

A DBE crystal is comprised of a periodic arrangement of unit cells as depicted in FIG. 1. FIG. 1 shows an example of energy propagation through the DBE crystal, wherein each unit cell may be comprised of two anisotropic dielectric layers A1 and A2 and one ferromagnetic layer F. The dielectric layers are misaligned with respect to their principle anisotropy axes. The ferrite layer is biased with an external dc magnetic field. An example of a dispersion diagram for a DBE crystal is shown in FIG. 2.

In one exemplary embodiment of the present invention, a microstrip transmission line geometry may emulate propagation in such DBE or MPC periodic structure. The microstrip geometry is also periodic. A unique aspect of the diagram in FIG. 2 is the flattening of the section of the k-ω curve (referred to as the DBE region) where the first and second derivatives vanish. In contrast, a regular band edge (RBE) crystal only has the first derivative zero.

Figure 3:
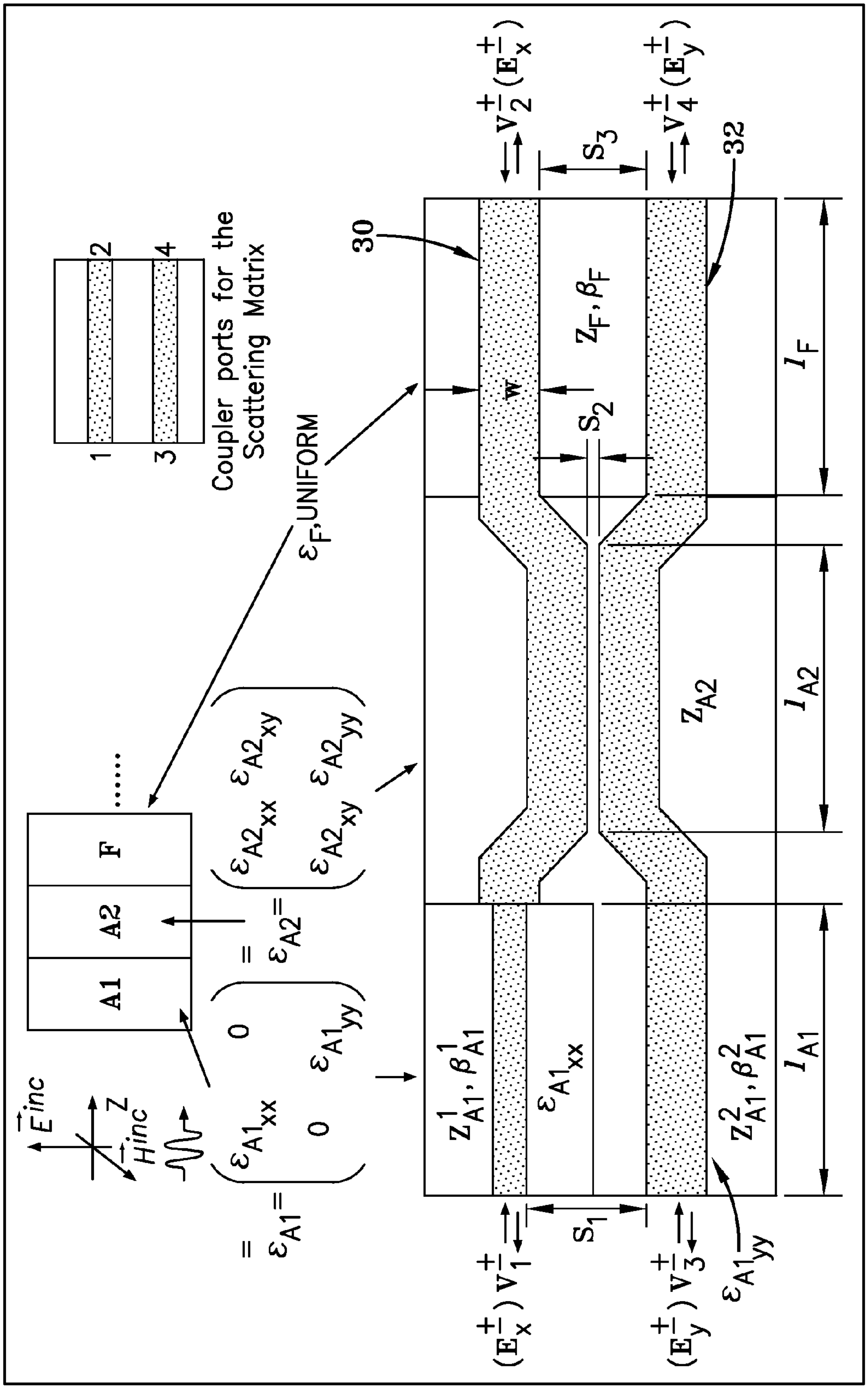
FIG. 3 is a schematic diagram of an exemplary embodiment of a printed microstrip transmission line geometry emulating the DBE crystal in FIG. 1 and indicating the correspondence of electric field waves within the DBE crystal and the voltage waves within the printed microstrip DBE structure.

To obtain the DBE dispersion in a printed microwave transmission line setting, the two principle electric field components $E_x$ and $E_y$ (propagating along z direction) are represented by pair of voltage waves having amplitudes $V_1$ and $V_3$, and propagating along two nearby microstrip lines 30 and 32 as displayed in FIG. 3. The corresponding transmitted fields (or voltages) are denoted as $V_2$ and $V_4$. That is, each of the three layers of the unit cell of the DBE crystal is represented by a four port network cascaded to build the periodic structure. For this exemplary embodiment of an equivalent microstrip circuit, the first anisotropic layer is modeled by two uncoupled microstrip lines 30 and 32. For the second layer, microstrip lines 30 and 32 are brought closer (see FIG. 3) and voltage waves are allowed to couple. In addition to proximity coupling, other methods of coupling (such as hybrid couplers) may also be readily used. Since $V_1$ propagates along microstrip line 30, whereas microstrip line 32 is associated with $V_3$, coupling among the lines emulates the off diagonal elements of the anisotropic permittivity tensor. Further, as indicated in FIG. 3, the diagonal terms of permittivity tensor may have different values. In this example, the ferrite layer, being a simple isotropic dielectric for the DBE crystal, can be modeled by a pair of uncoupled lines associated with an impedance and propagation constant.

Figure 4:
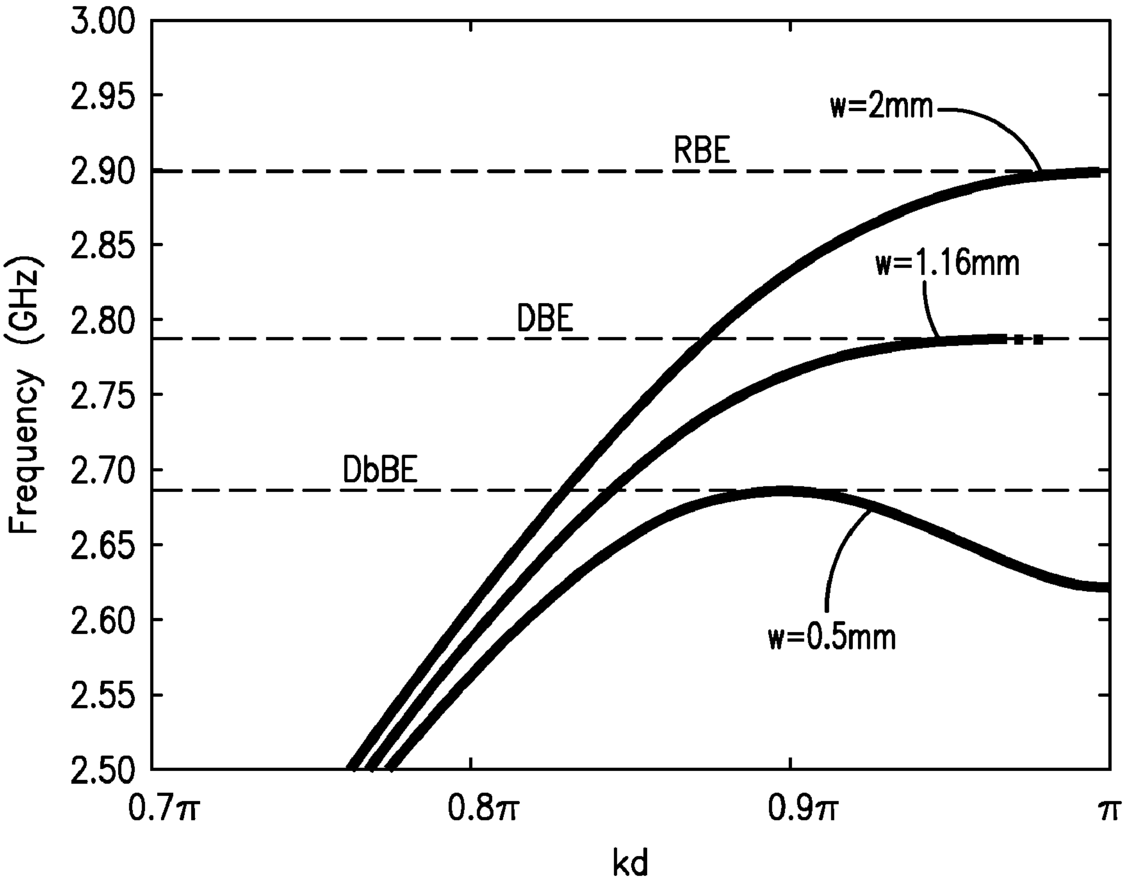
FIG. 4 is a graph of an example of different band edges that may be obtained by simply changing the microstrip width w of the $V_1$ fed line in the first section of the unit cell in FIG. 3.

For the example considered here (i.e., the DBE crystal), two sections are comprised of a pair of uncoupled lines. Therefore, their scattering matrix can be easily expressed using the standard scattering parameters for each of the lines. To generate the transfer matrices, the scattering parameters from all three sections may be normalized to a common impedance (e.g., $Z_N$=50Ω). The transfer matrix of the crystal unit cell can then be determined by cascading the layer transfer matrices. The propagation constants of the Bloch waves (a.k.a. dispersion relation) within a periodic arrangement of the unit cell can be determined from the eigenvalue statement, resulting in the design in FIGS. 3 and 4, whereby simply changing one geometrical parameter (line width w in this case) it is possible to achieve a RBE, DBE, or a double (or split) band edge behavior.

Figure 5A:
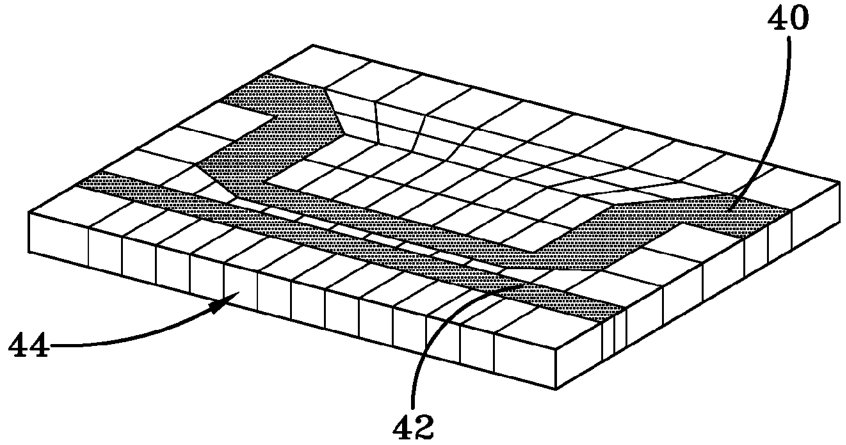
FIG. 5A is a schematic diagram of an exemplary embodiment of a printed coupled microstrip unit cell geometry printed on a uniform substrate to realize DBE dispersion.
Figure 5B:
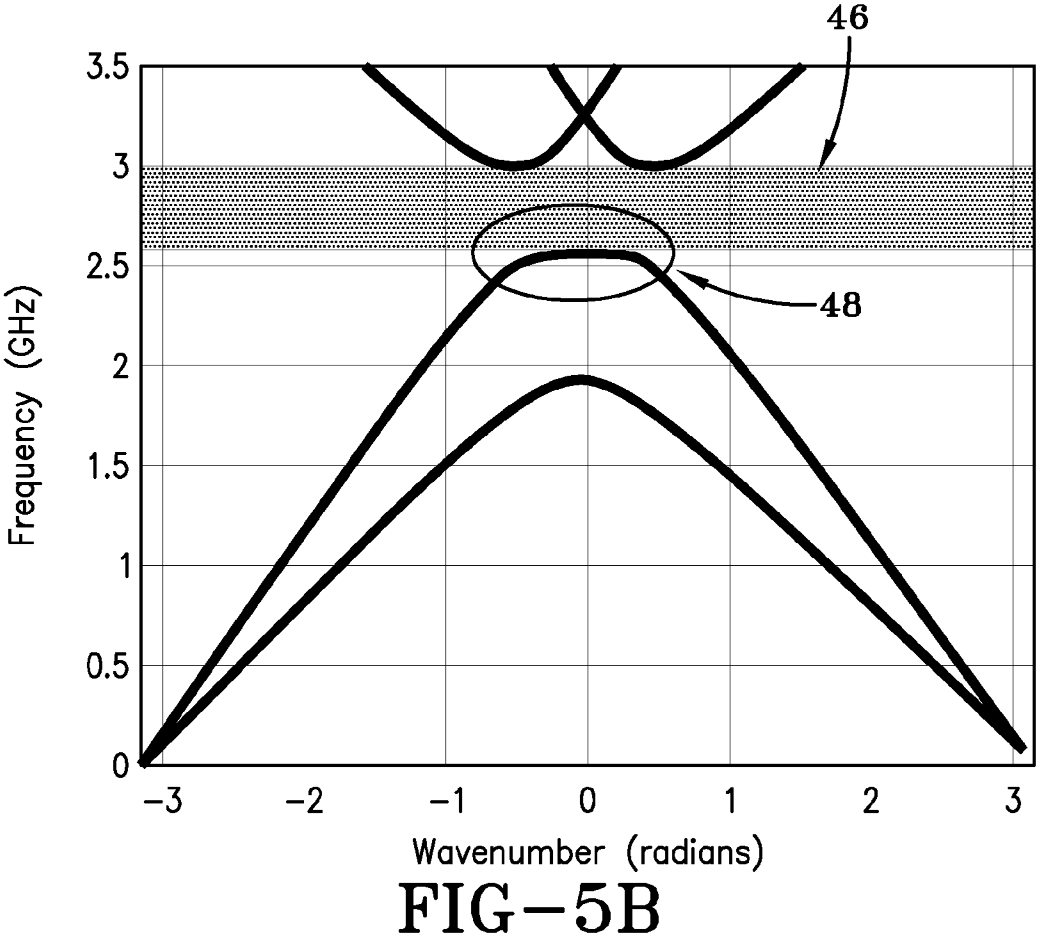
FIG. 5B is an example of a dispersion diagram of the unit cell in FIG. 5A indicating the band gap and the degenerate band edge.

In an exemplary embodiment, specially designed cascaded pairs of coupled and uncoupled transmission lines (e.g., see FIG. 3 and FIG. 5A) may replicate the same wave propagation characteristics observed in layered anisotropic material assemblies. In particular, FIG. 5A shows an example of a unit cell of a DBE structure, wherein transmission lines 40 and 42 are supported by a dielectric substrate 44. An exemplary embodiment of a structure may exhibit a degenerate frequency band edge (e.g., see FIG. 4 and FIG. 5B) or stationary inflection point (e.g., see FIG. 9B). In FIG. 5B, a photonic band gap 46 and a degenerate band edge 48 are indicated. The aforementioned characteristics may give rise to extraordinary propagation modes, much better frequency selectivity, nearly perfect matching, and deep wave penetration observed in the aforementioned special material assemblies (e.g., FIGS. 1 and 2). In an exemplary embodiment, all of the extraordinary phenomena can be replicated/reconstructed using a simple, relatively inexpensive, and easy to fabricate partially coupled transmission lines.

Figure 6:
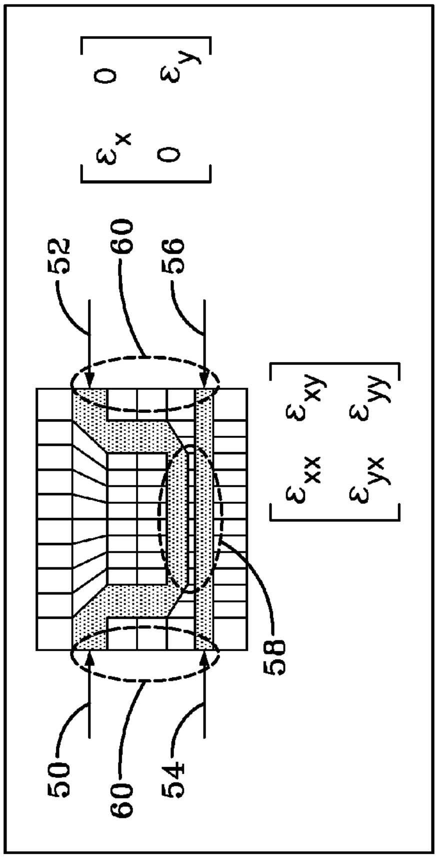
FIG. 6 is a schematic circuit model of an exemplary embodiment of a printed unit cell emulating DBE crystal, wherein equivalent permittivity tensors are indicated with reference to geometrical details.

In one exemplary embodiment, a transmission line pair may be used to emulate the crystal nature (e.g., matrix/tensor parameters) of anisotropic material layers. For example, uncoupled sections with different line characteristics may mimic perfectly aligned (with respect to incoming wave polarization) material parameters, and misaligned materials may be emulated by coupling the transmission line sections. In an exemplary embodiment, isotropic materials may be emulated using a pair of identical uncoupled transmission lines (e.g., see FIGS. 3 and 6). In FIG. 6, a 4-port circuit model is shown having a $1^{st}$ port 50, $2^{nd}$ port 52, $3^{rd}$ port 54, and $4^{th}$ port 56. In this example, a coupled portion 58 emulates misaligned anisotropy, and uncoupled portions 60 emulate aligned anisotropy.

Figure 7:
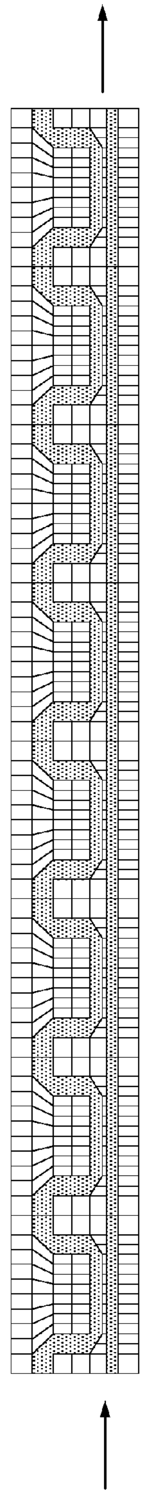
FIG. 7 is a schematic diagram of an exemplary embodiment of an 8-unit cell DBE microstrip structure for achieving slow waves and field growth within the coupled lines.
Figure 8:
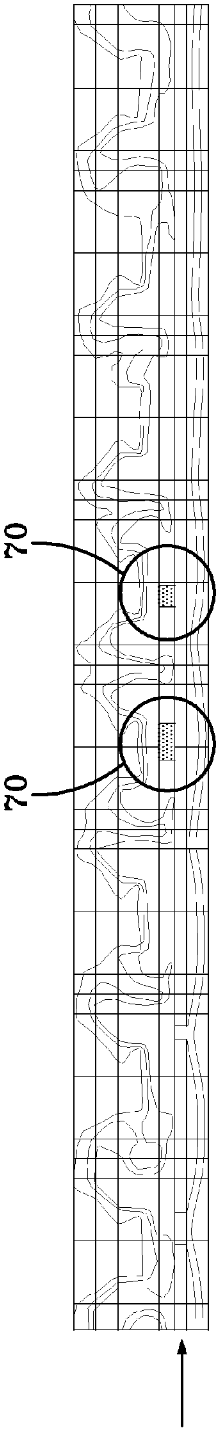
FIG. 8 is a schematic diagram of an electric field distribution in the 8-unit cell structure of FIG. 7 indicating the high field amplification within.

Optionally, conventional or otherwise suitable printed circuit technology including, but not limited to, printed circuit board technology may be used to realize partially coupled degenerate band edge transmission line sections on ordinary dielectric substrates. Biased ferromagnetic substrates can be used to achieve the frozen modes as a result of the stationary inflection point in dispersion. Multiple such sections (unit cells) can be manufactured and arranged in a linear or circular fashion to emulate layers of multiple isotropic and anisotropic materials (e.g., see a linear arrangement of unit cells in FIG. 7). In particular, FIG. 7 shows an example of an 8 unit cell printed periodic microstrip coupled line. On the other hand, FIG. 8 shows an example of an observed field along DBE microstrip coupled lines indicating field amplification 70.

In an exemplary embodiment, DBE behavior leading to extraordinary electromagnetic behavior in specially designed material crystals (e.g., see FIG. 4) may be emulated via multiple sections of printed TRLs (e.g., see FIG. 7) satisfying substantially the same design criteria as the material case (e.g., see FIG. 5). In an exemplary embodiment, electric field components may optionally be coded into voltage wave amplitudes in the TRL ports. Field behavior may be emulated by considering the behavior of voltage waves in an exemplary embodiment of a coupled TRL pair.

Figure 9A:
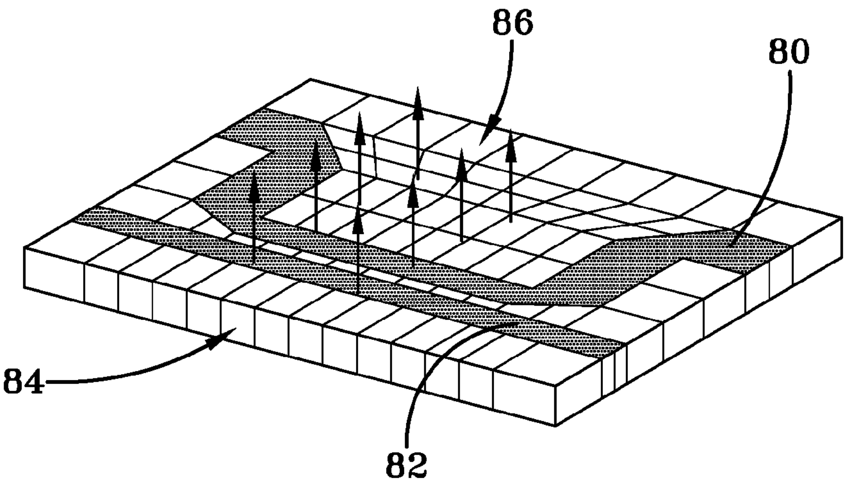
FIG. 9A is a schematic diagram of a unit cell geometry of a microstrip structure printed on a biased ferrite substrate, indicating the biasing direction and printed coupled microstrip lines.
Figure 9B:
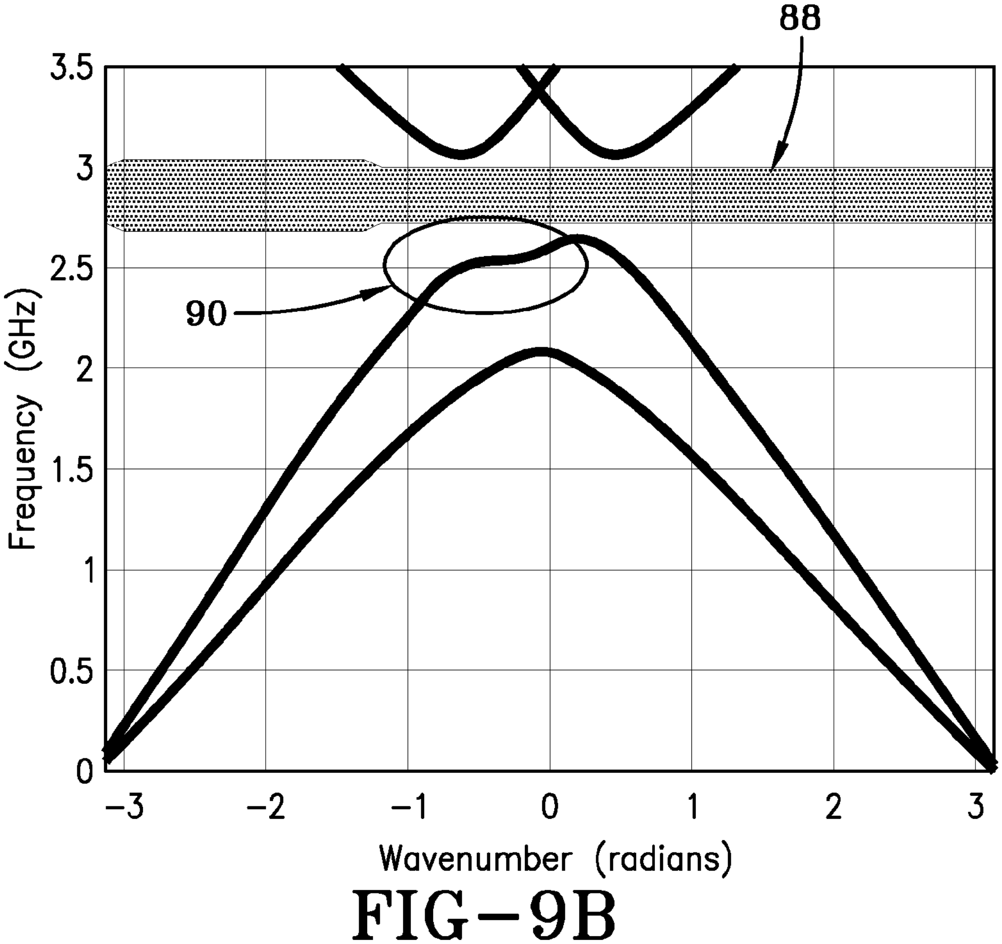
FIG. 9B is a graph of an example of a dispersion diagram of the printed unit cell in FIG. 9A indicating the band gap and the stationary inflection point resulting in frozen modes.

An exemplary embodiment of a structure, when manufactured on biased ferromagnetic materials (e.g., see FIG. 9A) may emulate the zero-group-velocity (i.e., frozen mode phenomenon, see FIG. 9B) regime in magnetic photonic crystals. In FIG. 9A, a unit cell of a frozen mode structure is shown, wherein transmission lines 80 and 82 are supported by a biased ferrite substrate 84 with a DC magnetic bias direction 86. In FIG. 9B, a band gap 88 and a stationary inflection point 90 are shown. In an exemplary embodiment, frozen mode frequency may be achieved through the emulation of Faraday rotation by the ferrite material and asymmetries in the geometrical layout of the structure.

Due to sharper resonances achievable using a coupled TRL concept, the voltage wave amplitudes in an exemplary embodiment of a structure of the present invention may be much higher that regular resonators. This can be harnessed in a variety of applications, such as optical modulators using field amplitudes and non-linear materials (e.g., see FIG. 8).

In an exemplary embodiment, frozen modes of magnetic material crystals may be emulated for the voltage waves in an exemplary embodiment of a structure of the present invention. Wave slow down and amplitude increase (wave compression) may be mimicked, one-to-one, in this simple-to-manufacture structure (e.g., see FIG. 9*b*).

Figure 10A:
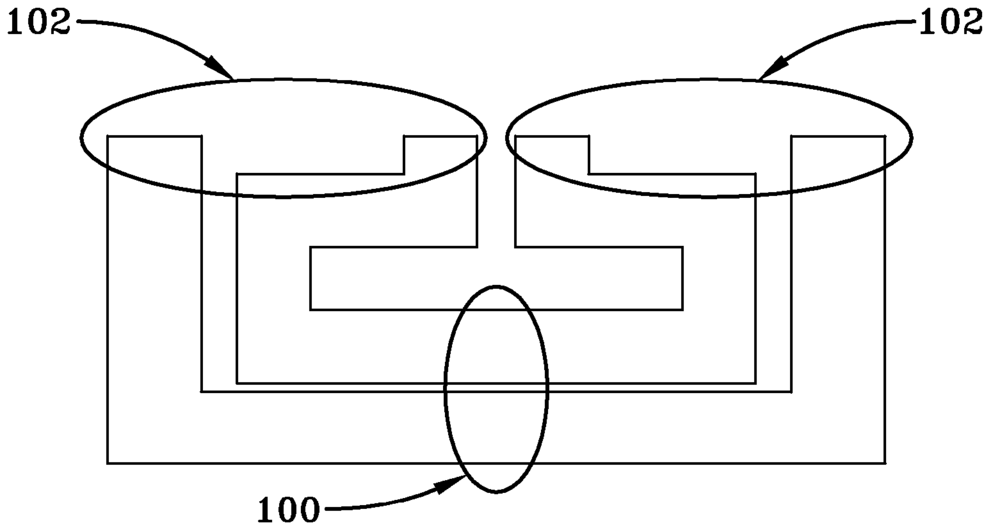
FIG. 10A is a schematic diagram of an exemplary embodiment of a DBE microstrip unit cell suitable for circular periodic arrangement to form a radiating structure such as a resonant antenna.
Figure 10B:
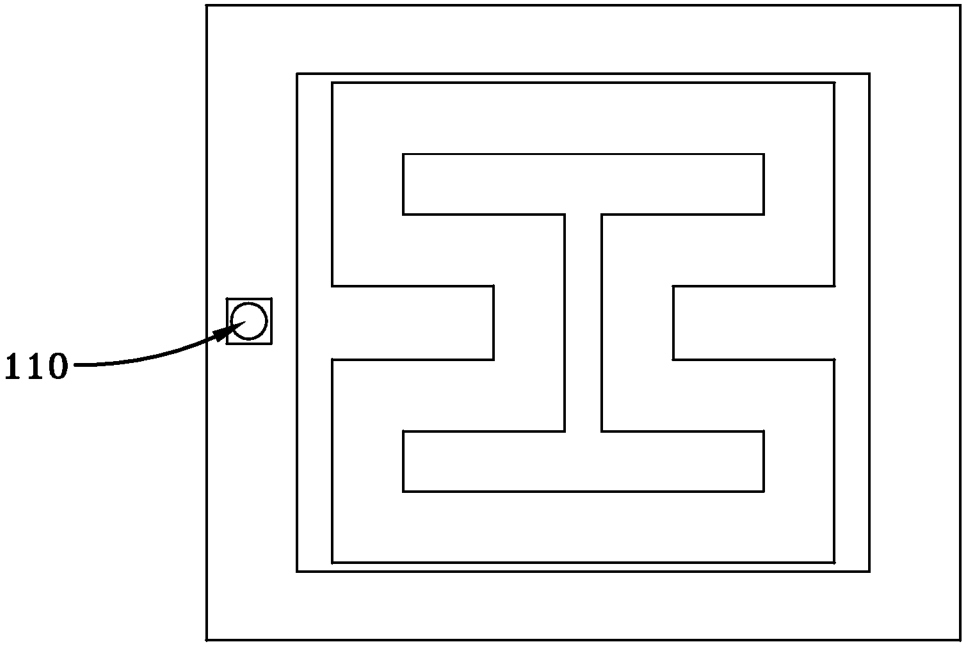
FIG. 10B is a schematic diagram of an exemplary embodiment of a resonant antenna geometry realized by wrapping two DBE unit cells depicted in FIG. 10A in a circular fashion, wherein an example of a coaxial line feed location is also indicated.

In an exemplary embodiment, resonant antennas may be made from either wrapping two or more coupled lines, or by short (or open) circuiting some or all of the ports of the structure, thereby enabling realization of small resonant antennas (e.g., see FIG. 10B). Such resonant antennas may be among the physically smallest to date. This exemplary approach allows for a systematic design of such antennas. FIG. 10A shows an example of a microstrip DBE unit cell having a coupled section 100 and uncoupled sections 102. In FIG. 10B, two unit cells are wrapped in a circular fashion to form an antenna layout, which may be in electrical communication (e.g., capacitively coupled) with an antenna feed (e.g., a 50Ω coaxial cable), generally indicated at 110 in this example. In this exemplary embodiment, the structure is approximately 1.05 inch (2.67 cm) by 0.88 inch (2.24 cm). This exemplary embodiment of a substrate has the following characteristics: duroid, $\epsilon$=2.2 tan $\delta$=0.0009, 2 inch×2 inch (~5.08 cm×5.08 cm), and 100 mil thick. These dimensions and characteristics are provided for exemplary purposes only. Other suitable dimensions and characteristics are possible.

Contrary to bulk material crystals where only two degrees of freedom exist due to orthogonal polarizations, it is possible to include many more additional transmission lines with proximity coupling in exemplary embodiments of the present invention. This may allow for a much richer variety of propagation modes and field behavior not present in material crystals. Such exemplary embodiments may allow for unprecedented modes with extraordinary propagation and resonance behaviors leading, for example, to miniature antennas and arrays as well as various RF and optical circuit components.

Furthermore, in an exemplary embodiment, multi-line, ferrite-substrate structures can be tuned to give rise to unprecedented dispersion relations with unforeseen characteristics (such as degenerate inflection points, or multiple frozen modes regimes).

All of the above exemplary structures may possess a negative propagation index for higher frequencies. Ferromagnetic materials or substrates may allow tuning of such negative index regions as well as the aforementioned extraordinary frozen modes. Furthermore, multi-line structures may give rise to special negative index modes and fields (e.g., see FIG. 12). In FIG. 12, an example of a negative index region 120 is indicated.

Figure 13A:
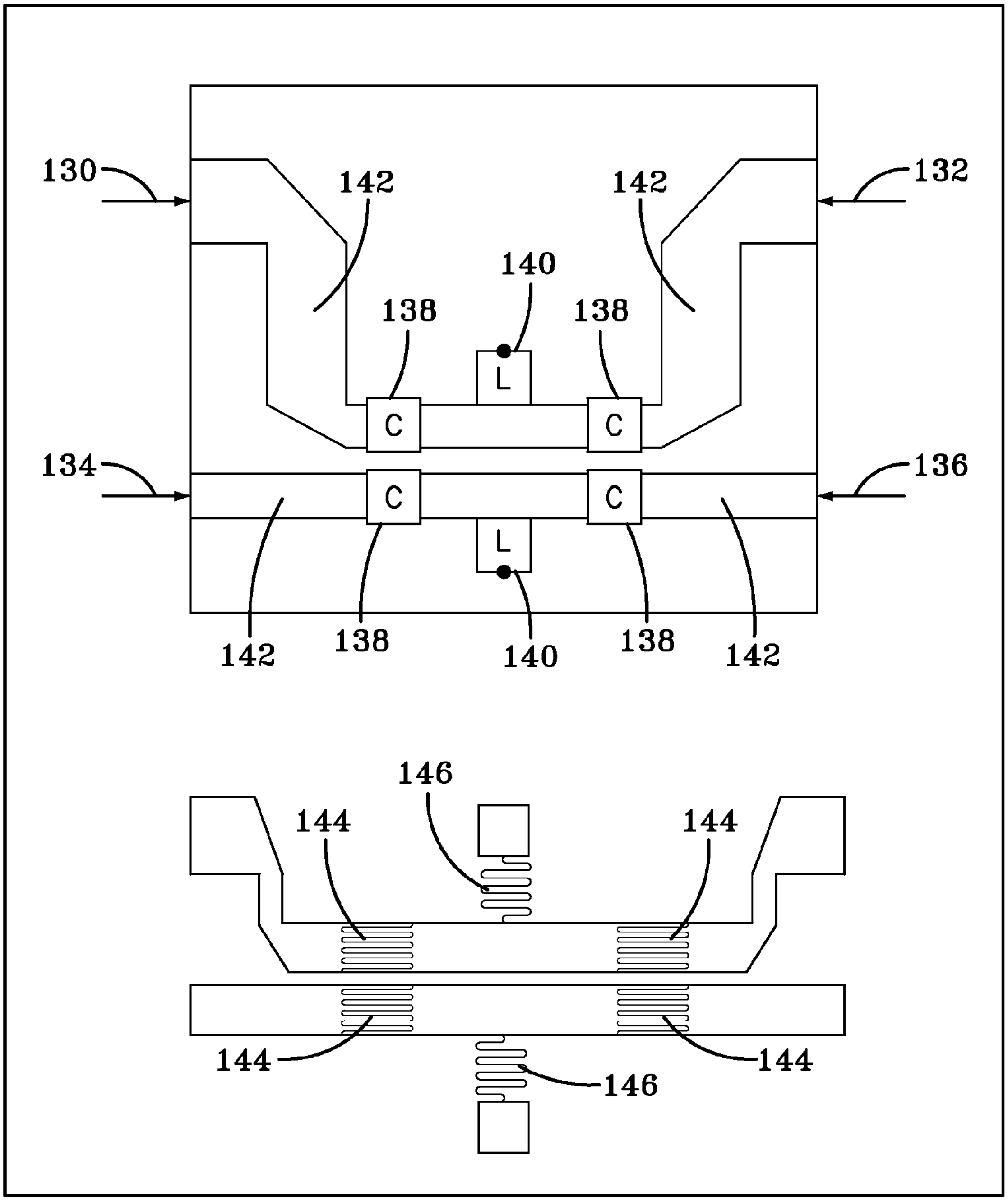
FIG. 13A is a schematic diagram of an exemplary embodiment of a generalized microstrip layout, wherein the microstrip lines are loaded with capacitive and inductive elements to realize low frequency band gaps and negative permittivity and permeability.
Figure 13B:
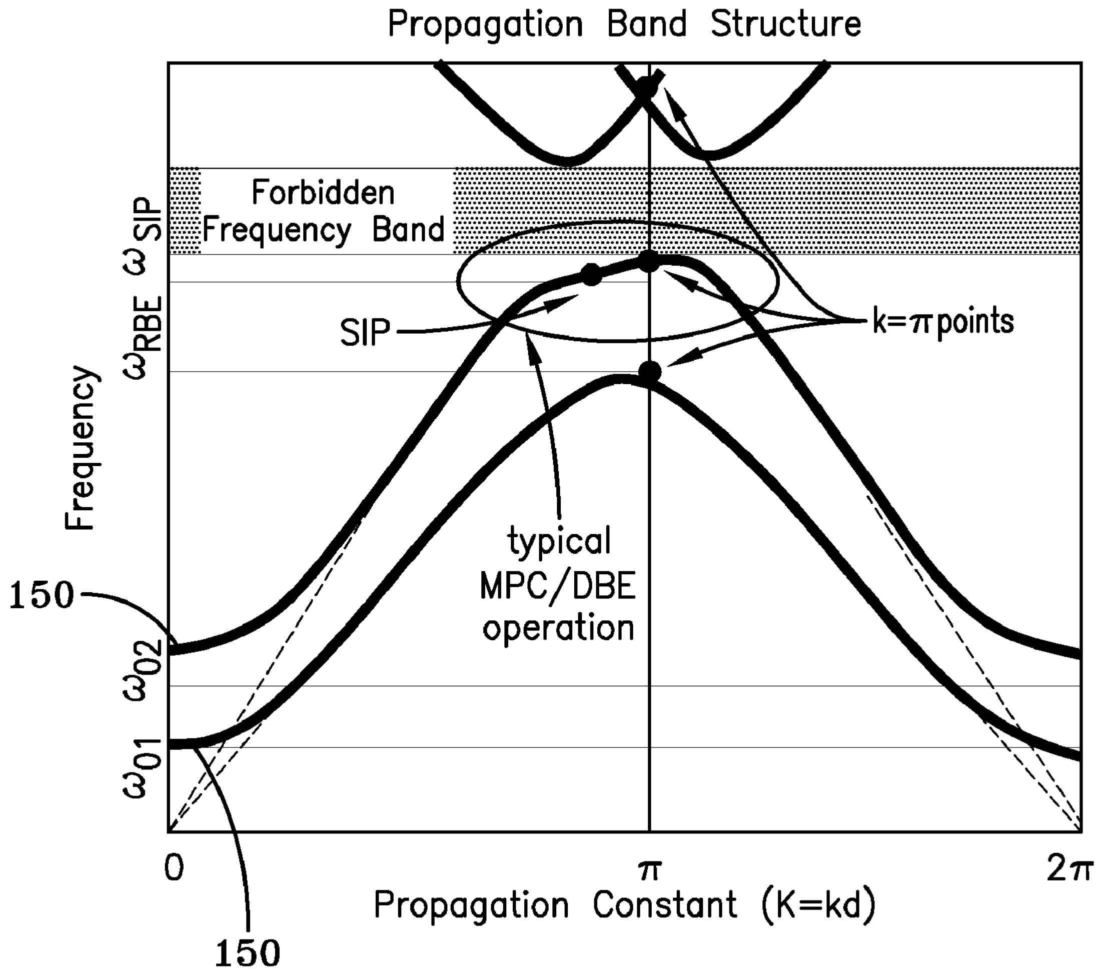
FIG. 13B is an example of a corresponding dispersion diagram of the microstrip layout of FIG. 13A.

Low frequency resonances may be introduced to a band structure of an exemplary geometry of the present invention by strategically placing capacitive and inductive circuit components into the coupled lines. This may allow for unprecedented mode behavior (e.g., see FIGS. 13A and 13B). Lumped elements can optionally be made into the metal printings, and thus may not add to manufacturing complexity (e.g., see FIG. 13A). In FIG. 13, a 4-port circuit model having a $1^{st}$ port 130, $2^{nd}$ port 132, $3^{rd}$ port 134, and $4^{th}$ port 136 is shown. In addition, series chip capacitors 138 and parallel chip inductors 140 are provided in electrical communication with microstrip transmission lines 142. An corresponding example of interdigital capacitors 144 and shunt inductors 146 is also provided. FIG. 13B shows an example of a dispersion diagram wherein forcing MPC/DBE behavior to operate at K=0 may be more desirable for miniaturization and bandwidth (e.g., see portions 150 of the dispersion diagram).

Degenerate resonances in anisotropic material crystals may be emulated by an exemplary embodiment of the present invention and give rise to much sharper resonances around degenerate band edge, thereby enabling the realization of highly selective microwave filters.

Frozen or extremely slow voltage waves in an exemplary embodiment of a structure of the present invention may experience loss much more than regular fast waves. Incorporating some loss into the surrounding material, such as in a printed circuit board may allow for very high loss in small physical size, thereby enabling realization of very small isolators.

In an exemplary embodiment, voltage waves slowed down by the frozen mode phenomena can couple much more effectively onto nearby transmission lines and/or structures. This may lead to increased efficiency directional couplers with much smaller physical size.

In an exemplary embodiment, phase of slow voltage waves may change much more rapidly within a small physical length. Thus, smaller phase shifter blocks or microwave matching stubs can be realized.

Ferromagnetic substrates in an exemplary embodiment may allow for adjustable external magnetic bias field for tuning voltage wave phase shifts within a physically small structure.

Figure 11A:
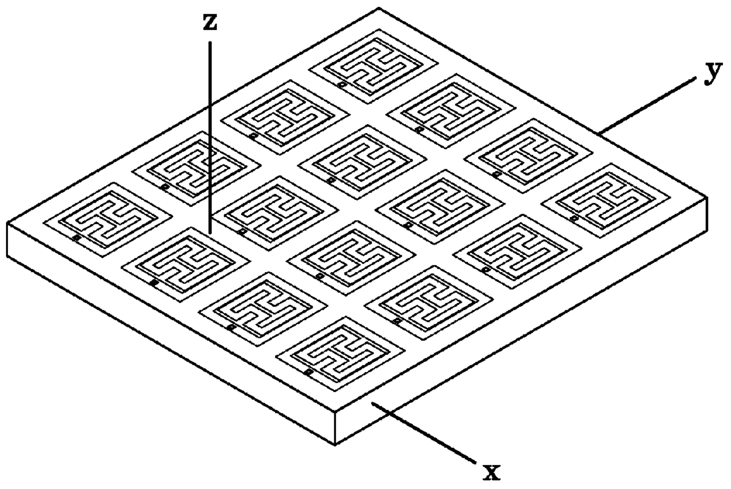
FIG. 11A is a schematic diagram of an exemplary embodiment of a 4-by-4 antenna array geometry using the DBE antenna of FIG. 10B.
Figure 11B:
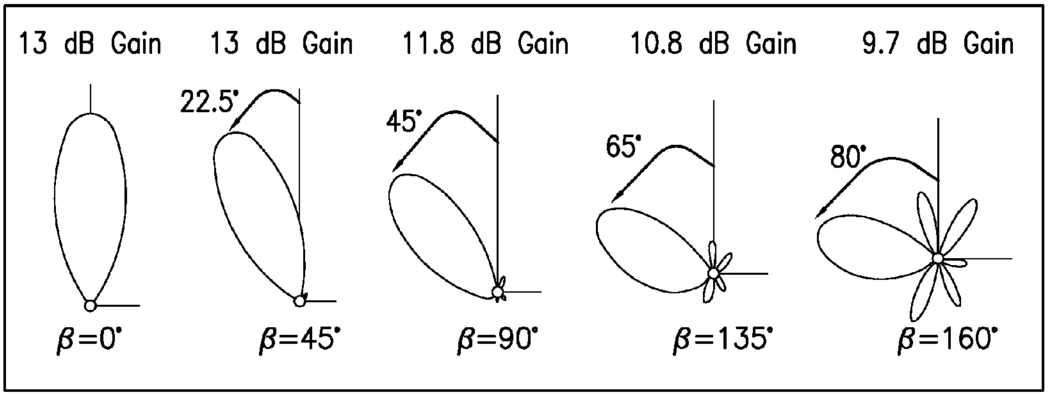
FIG. 11B is a schematic representation of an example of the scan performance of the main beam of the array antenna of FIG. 11A.

Arrays of the above antennas can be designed with minimal intra-element coupling due their small size and allow for continuous beam-scanning (e.g., see FIG. 11A). FIG. 11A shows an example of a 4×4 antenna array geometry using a DBE antenna of FIG. 10B, and FIG. 11B shows an example of a scan performance of a main beam of the antenna array of FIG. 11A. Alternatively, an exemplary array of the present invention may provide a wider operation bandwidth when the elements are closely packed and allowed to couple.

An exemplary embodiment of a structure printed on a ferromagnetic substrate may allow an external bias field to tune operation frequency, radiation direction, gain, bandwidth, and input impedance of antennas and arrays.

Simple exemplary models of multiple partially coupled transmission lines of the present invention can be used to systematically design the resonances associated with each degenerate mode frequency to be in succession, thus creating a broadband operation. Also, some resonances can be grouped together to make antennas and arrays with multiple simultaneous bands of operation.

Figure 14:
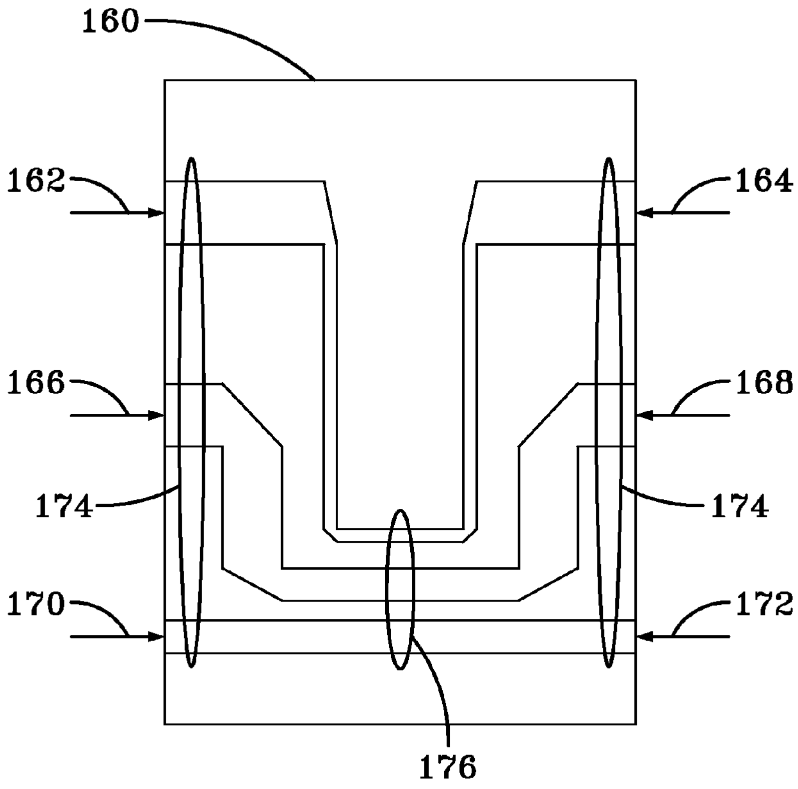
FIG. 14 is a schematic diagram of an exemplary embodiment of multiple coupled transmission lines that may be designed to achieve higher order degenerate modes that do not exist in bulk media, thereby allowing for modes that do not exist in nature.

As previously mentioned, various advantages may be achieved using three or more transmission lines. FIG. 14 shows an example of multiple transmission lines supported by a dielectric substrate 160 and designed to achieve higher order degenerate modes that do not exist in bulk media. This allows for modes that do not exist in nature. In particular, the exemplary unit cell of FIG. 14 has a $1^{st}$ port 162, $2^{nd}$ port 164, $3^{rd}$ port 166, $4^{th}$ port 168, $5^{th}$ port 170, and $6^{th}$ port 172, and there are uncoupled sections 174 and a coupled section 176 of the three transmission lines. In other exemplary embodiments, a unit cell may include more than three transmission lines.

Figure 15:
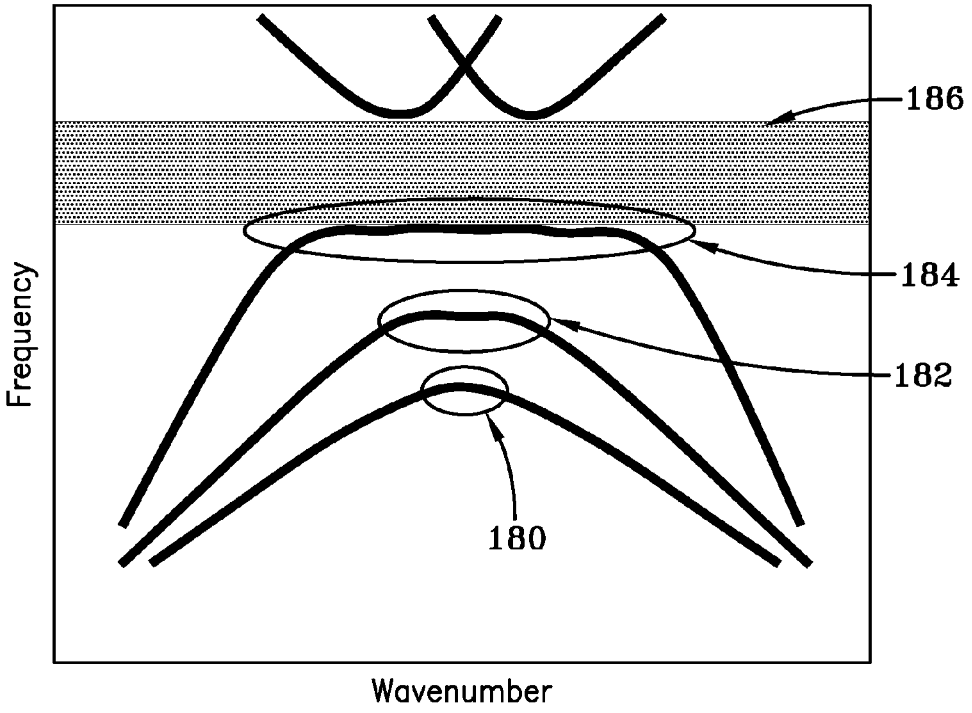
FIG. 15 is an example of a dispersion diagram for a 3-coupled transmission line unit cell in which the band edge may be designed to exhibit $6^{th}$ order degeneracy (realizable only using multiple coupled transmission lines, i.e., these mode do not exist in nature).

FIG. 15 is an example of a dispersion diagram for a 3-coupled transmission line unit cell in which the band edge may be designed to exhibit $6^{th}$ order degeneracy. In particular, the dispersion diagram shows examples of $2^{nd}$ order RBE 180, $4^{th}$ order DBE 182, $6^{th}$ order DBE 184, a band gap 186. Such performance is realizable only using multiple coupled transmission lines. These modes do not exist in nature.

Figure 16:
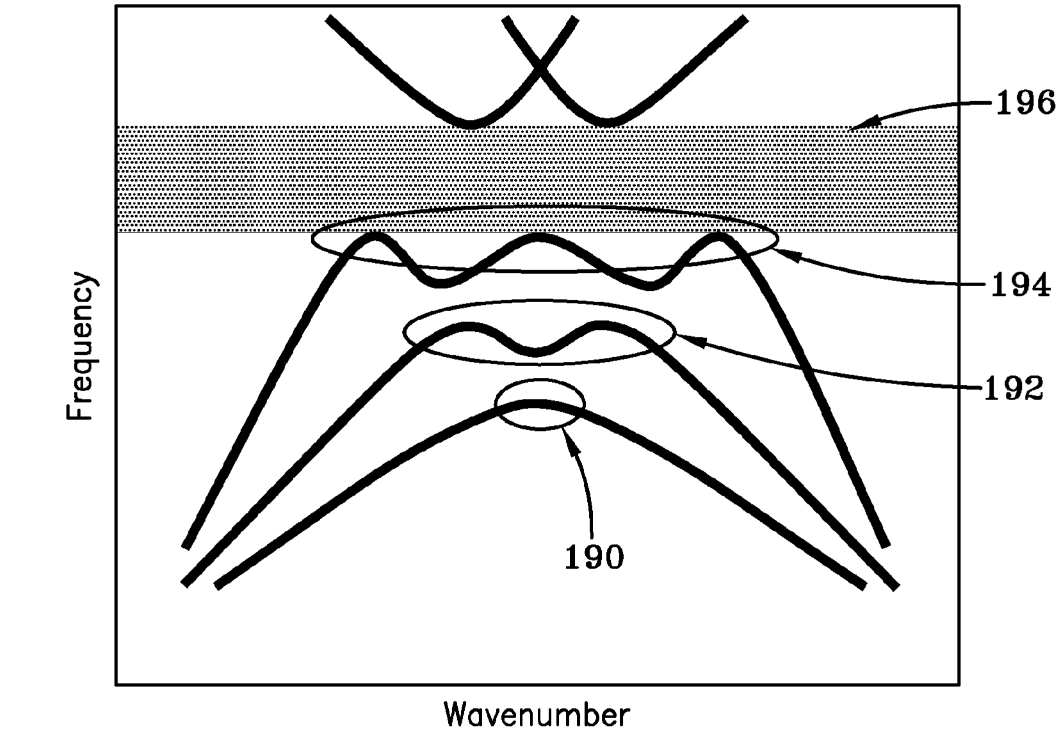
FIG. 16 is an example of a dispersion diagram for a 3-coupled transmission line unit cell in which the band edge may be designed to exhibit three peaks (also realizable only using multiple coupled transmission lines, i.e., these mode do not exist in nature).

FIG. 16 is an example of a dispersion diagram for a 3-coupled transmission line unit cell in which the band edge may be designed to exhibit three peaks. In FIG. 16, examples of $2^{nd}$ order RBE 190, a double band edge 192, a triple band edge 194, and a band gap 196 are shown. Again, such performance is realizable only using multiple coupled transmission lines. These modes do not exist in nature.

Figure 17:
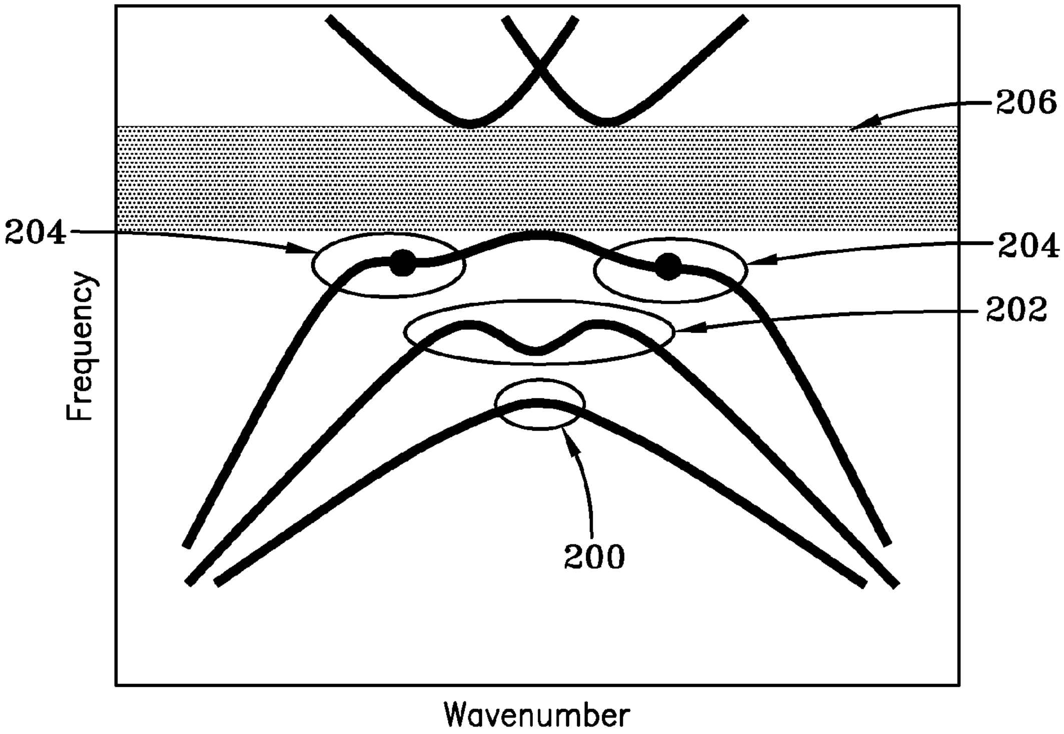
FIG. 17 is an example of a dispersion diagram for a multiple-coupled transmission line unit cell in which reciprocal stationary inflection points may be achieved without using ferromagnetic materials.

FIG. 17 is an example of a dispersion diagram for a multiple-coupled transmission line unit cell in which reciprocal stationary inflection points may be achieved without using ferromagnetic materials. In particular, FIG. 17 shows examples of $2^{nd}$ order RBE 200, double band edge 202, reciprocal SIPs 204, and a band gap 206.

Figure 18:
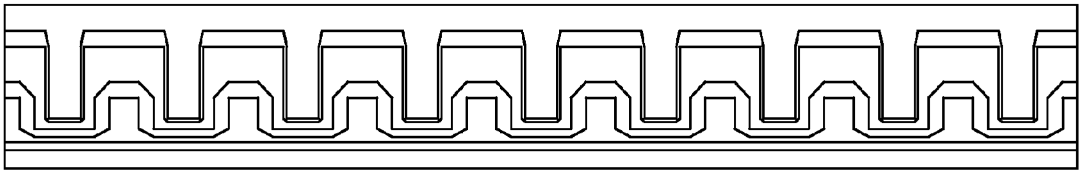
FIG. 18 is a schematic diagram of an exemplary embodiment of multiple coupled transmission lines, which can be readily manufactured using standard printed microwave circuit board technology.

FIG. 18 is a schematic diagram of an exemplary embodiment of multiple coupled transmission lines, which can be readily manufactured using standard printed microwave circuit board technology. In particular, this is an example of a 9 unit cell $6^{th}$ order degenerate band edge structure.

Figure 19:
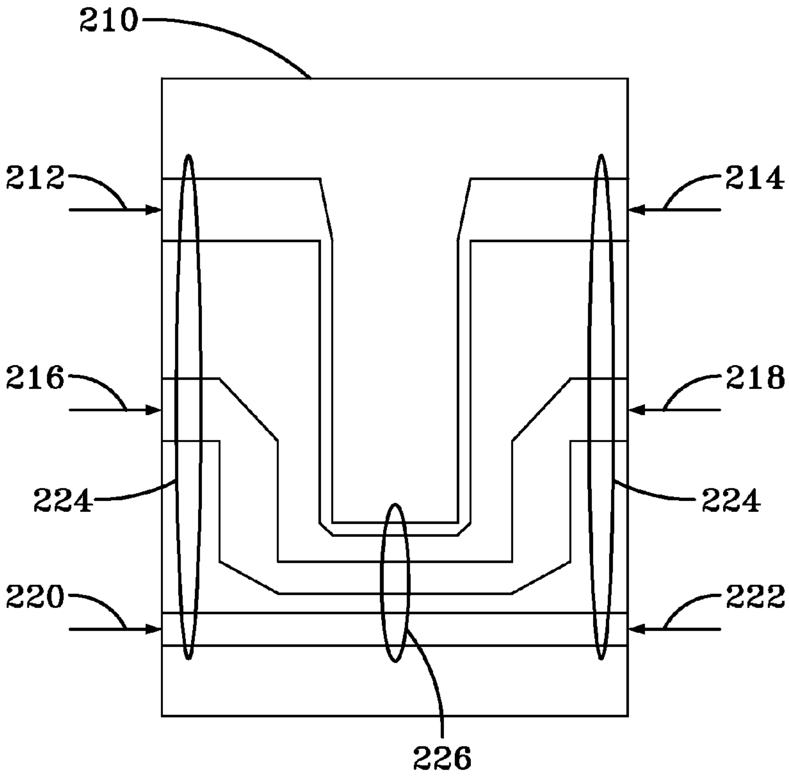
FIG. 19 is a schematic diagram of an exemplary embodiment of multiple coupled transmission lines, which may be printed on biased ferromagnetic substrates to achieve even broader mode control.

FIG. 19 is a schematic diagram of an exemplary embodiment of multiple coupled transmission lines, which may be printed on a biased ferromagnetic substrate 210 to achieve even broader mode control. In this example, the unit cell is comprised of a $1^{st}$ port 212, $2^{nd}$ port 214, $3^{rd}$ port 216, $4^{th}$ port 218, $5^{th}$ port 220, and $6^{th}$ port 222, and there are uncoupled sections 224 and a coupled section 226 of the three transmission lines.

Figure 20:
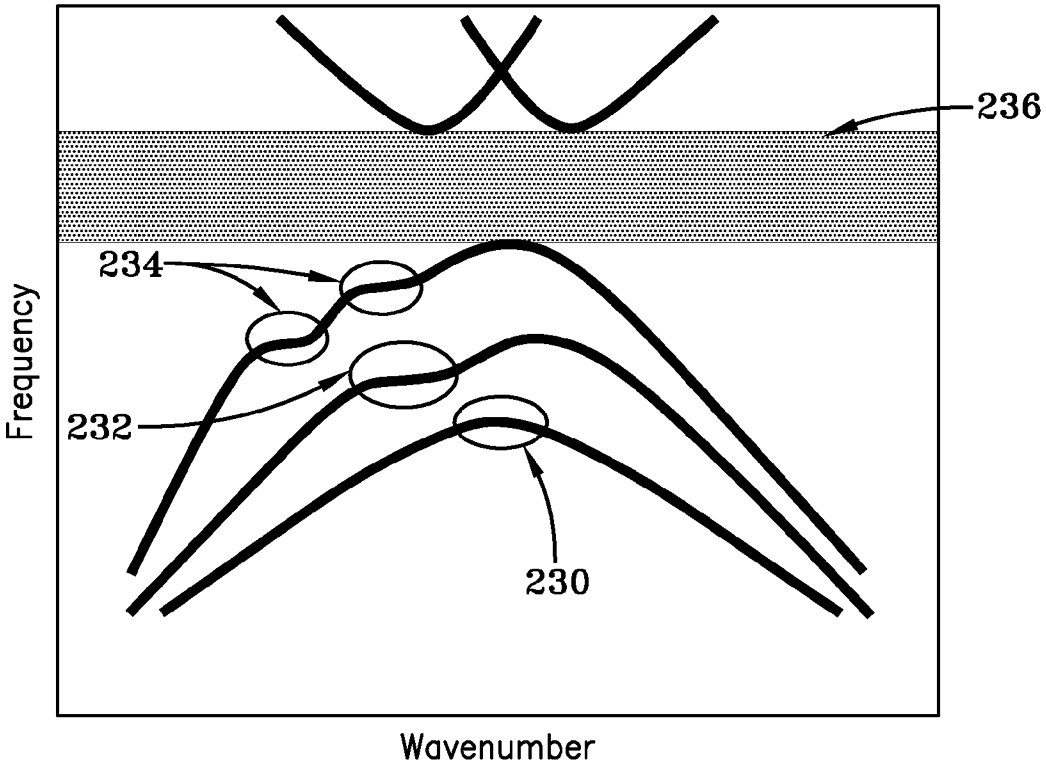
FIG. 20 is an example of a dispersion diagram, wherein multiple coupled transmission lines (i.e., TRLs) allow for multiple stationary inflection points that enable frozen modes at multiple frequencies and that can also be utilized to increase the frequency bandwidth of the slow propagation modes.

FIG. 20 is an example of a dispersion diagram, wherein multiple coupled TRLs allow for multiple stationary inflection points that enable frozen modes at multiple frequencies and that can also be utilized to increase the frequency bandwidth of the slow propagation modes. In this example, RBE 230, SIP 232, multiple SIPs 234, and a band gap 236 are shown.

Figure 21:
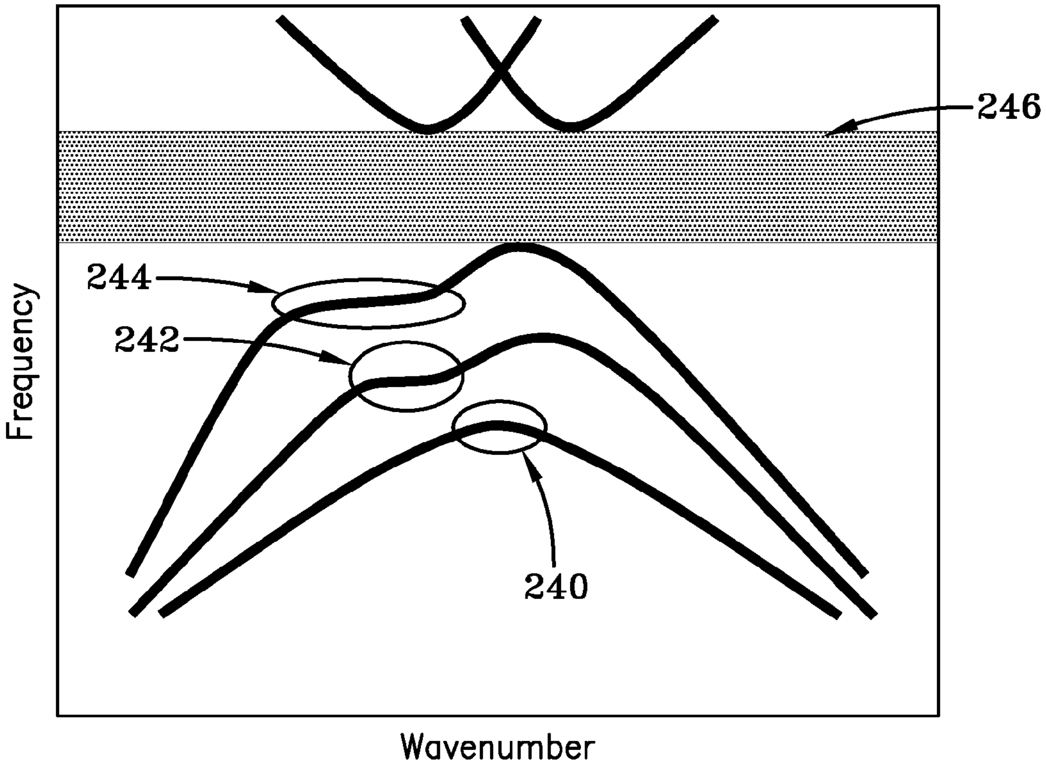
FIG. 21 is an example of a dispersion diagram, wherein multiple coupled TRLs can be designed to achieve stationary inflection points with a higher degree of flatness, thereby allowing for unprecedented mode diversity, and wherein different branches may be designed to exhibit SIPs simultaneously.

FIG. 21 is an example of a dispersion diagram, wherein multiple coupled TRLs can be designed to achieve stationary inflection points with a higher degree of flatness, thereby allowing for unprecedented mode diversity. Such as in this example, different branches may be designed to exhibit SIPs simultaneously. In particular, FIG. 21 shows examples of RBE 240, $2^{nd}$ order SIP 242, $4^{th}$ order SIP 244, and a band gap 246.

In summary, numerous advantages are possible using exemplary embodiments of the present invention including, but not limited to, the following:

1) At least a partially coupled transmission line (TRL) pair to emulate material anisotropy using printed circuits: Emulates electromagnetic wave propagation in anisotropic materials with misaligned crystal parameters via a simple, easy-to-manufacture transmission line structure.
2) Partially coupled TRL concept: Coupling between vector-wave components in anisotropic materials may be emulated using at least a pair of coupled (e.g., by proximity, or by other suitable means) transmission lines.
3) Emulation of electromagnetic band gap and photonic crystals: Employs printed circuit technology to realize coupled and uncoupled line sections to emulate anisotropic electromagnetic band gap (EBG) and photonic crystals in printed form.
4) Realization of degenerate band edge (DBE) behavior in anisotropic crystals: Uses microstrip coupled TRLs to mimic dispersion in anisotropic DBE crystals.
5) Realization of magnetic photonic crystals (MPCs) using at least a TRL pair: An exemplary embodiment of a structure, when printed on a properly magnetized ferromagnetic substrate, may mimic the dispersion diagram observed in MPC materials.
6) Realization of field amplification within a structure: An exemplary embodiment of a structure supports degenerate modes that lead to higher voltage waves within the structure.
7) Inflection point realization using at least a TRL pair emulating the frozen mode concept: An exemplary embodiment of a ferrite substrate structure may emulate the frozen mode frequency in wave behavior.
8) Realization of small printed antennas using at least a TRL pair emulating the DBE modes. Physical sizes of antennas made from an exemplary embodiment of a non-magnetic structure may be smaller than regular antennas due to the slow modes.
9) Higher-order degenerate modes and fields in printed structures: As a direct extension of the above concept, 3 or more partially coupled lines may allow for extraordinary modes with more-than-$2^{nd}$ order field degeneracy leading to direct amplification of the effects itemized above.

10) Multi-TRL made of ferromagnetic substrate for external tunability: Tunable operation in antennas, arrays, and matching networks can be achieved using exemplary embodiments of structures using ferrite substrates and an external magnetic bias field.

11) Negative refraction behavior: Wave behavior in exemplary embodiments of structures can be designed to exhibit negative propagation at certain frequency bands. With ferrite materials, these negative index regions can be controlled.

12) Coupled lines with incorporated lumped-circuit elements: Coupled line mode structure may be improved for low frequency operation using additional capacitor and inductor lumped elements.

13) Realization of super-selective microwave (and possibly optical) filters concept: An exemplary embodiment of a structure may support degenerate modes that allow for much stronger frequency selectivity leading to filter designs with improved quality factors and smaller physical size.

14) Improved microwave isolators: Frozen modes supported by an exemplary embodiment of a structure may magnify losses due to slow wave propagation, thereby leading to physically smaller isolators.

15) Improved directional couplers: Performance of standard directional couplers can be improved making use of slow wave propagation in an exemplary embodiment of a structure leading to physically smaller directional couplers.

16) Realization of physically smaller phase shifters and matching stubs. Due to slow wave propagation, physically smaller phase shifters and matching stubs may be realized.

17) Realization of adjustable phase shifters: Wave phase and group velocities can be controlled using an external magnetic bias field (for the ferrite material) to make physically small adjustable phase shifters.

18) Realization of small antennas for arrays with low intra-element coupling and larger bandwidth: Smaller size of printed antenna elements may allow for densely packed arrays with much less coupling and improved performance.

19) Tunable antennas and arrays: External magnetic bias may be used to tune the operation frequency of printed antennas and arrays.

20) Multi-TRL unit cell as a design tool for broadband antennas: In an exemplary embodiment, wave propagation in a multi-transmission line structure may be tuned and successive resonances may be aligned to achieve broadband or multi-band operation for antennas and matching networks.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A unit cell structure comprising:

at least a pair of transmission lines in proximity, said at least a pair of transmission lines adapted to emulate energy propagation in anisotropic material when energized by having coupled and uncoupled sections.

2. The unit cell structure of claim 1 wherein said at least a pair of transmission lines are adapted to emulate energy propagation in degenerate band edge (DBE) crystal when energized.

3. The unit cell structure of claim 1 wherein said at least a pair of transmission lines are adapted to emulate energy propagation in magnetic photonic crystal (MPC) when energized.

4. The unit cell structure of claim 1 wherein said at least a pair of transmission lines are secured to a dielectric substrate.

5. The unit cell structure of claim 1 wherein said at least a pair of transmission lines are secured to a substrate comprised of ferromagnetic material.

6. The unit cell structure of claim 1 wherein:

said at least a pair of transmission lines are secured to a substrate; and said at least a pair of transmission lines are adapted to emulate a frozen mode of magnetic photonic materials when said substrate is tuned by a magnetic bias field.

7. The unit cell structure of claim 1 further comprising at least one capacitive component inserted in at least one transmission line of said at least a pair of transmission lines to assist with improving mode control.

8. The unit cell structure of claim 1 further comprising at least one inductive component inserted in at least one transmission line of said at least a pair of transmission lines to assist with improving mode control.

9. The unit cell structure of claim 1 further comprising at least one inductive component and at least one capacitive component inserted in at least one transmission line of said at least a pair of transmission lines to assist with improving mode control.

10. The unit cell structure of claim 1 wherein said at least a pair of transmission lines are adapted to be energized by electrical energy.

11. The unit cell structure of claim 1 wherein said at least a pair of transmission lines are adapted to be energized by optical energy.

12. The unit cell structure of claim 1 wherein the unit cell structure comprises at least one additional transmission line coupled to said at least a pair of transmission lines.

13. The unit cell structure of claim 12 wherein said at least one additional transmission line and said at least a pair of transmission lines are adapted to emulate sixth ($6^{th}$) order band edge degeneracy.

14. The unit cell structure of claim 12 wherein said at least one additional transmission line and said at least a pair of transmission lines are adapted to provide a band edge having at least three peaks.

15. The unit cell structure of claim 12 wherein said at least one additional transmission line and said at least a pair of transmission lines are adapted to provide a band edge having reciprocal stationary inflection points.

16. The unit cell structure of claim 15 wherein said reciprocal stationary inflection points are adapted to be achieved using a non-ferromagnetic substrate in association with said at least one additional transmission line and said at least a pair of transmission lines.

17. The unit cell structure of claim 12 wherein said at least one additional transmission line and said at least a pair of transmission lines are secured to a substrate comprised of ferromagnetic material.

18. The unit cell structure of claim 12 wherein said at least one additional transmission line and said at least a pair of transmission lines are adapted to provide multiple stationary inflection points, which allow for frozen modes at multiple frequencies.

19. The unit cell structure of claim 12 wherein said at least one additional transmission line and said at least a pair of transmission lines are adapted to provide multiple stationary inflection points, with an increase of frequency bandwidth of slow propagation modes.

20. The unit cell structure of claim 12 wherein said at least one additional transmission line and said at least a pair of transmission lines are adapted to provide multiple stationary inflection points with a higher degree of flatness for improved mode diversity.

21. The unit cell structure of claim 12 wherein said at least one additional transmission line and said at least a pair of transmission lines are adapted to provide different branches of dispersion that simultaneously exhibit stationary inflection points.

22. The unit cell structure of claim 1 wherein the unit cell structure is adapted to be used for one or more of antennas, antenna arrays, resonators, optical modulators, filters, isolators, directional couplers, and phase shifters and matching stubs.

23. A structure comprising:

at least two unit cells arranged in a linear or circular fashion, each unit cell comprising at least a pair of transmission lines in proximity, said at least a pair of transmission lines adapted to emulate energy propagation in anisotropic materials when energized by having coupled and uncoupled sections.

24. The structure of claim 23 wherein the structure is an antenna.

25. The structure of claim 23 wherein the structure is a high quality resonator.

26. The structure of claim 23 wherein the structure is an optical modulator.

27. The structure of claim 23 wherein the structure is a filter.

28. The structure of claim 23 wherein the structure is an isolator.

29. The structure of claim 23 wherein the structure is a directional coupler.

30. The structure of claim 23 wherein the structure is a phase shifter.

31. The structure of claim 23 wherein each unit cell comprises at least one additional transmission line coupled to said at least a pair of transmission lines such that the structure is a broadband antenna.

32. The structure of claim 23 wherein:

each unit cell comprises at least one additional transmission line coupled to said at least a pair of transmission lines; and said unit cells are arranged in a linear fashion.

33. A method of emulating energy propagation in anisotropic materials, said method comprising:

providing at least a periodic pair of transmission lines such that there are coupled and uncoupled sections; and energizing said at least a pair of transmission lines to emulate energy propagation in anisotropic materials.

34. The method of claim 33 wherein energy propagation in degenerate band edge (DBE) crystals is emulated.

35. The method of claim 33 wherein energy propagation in magnetic photonic crystals (MPC) is emulated.

36. The method of claim 33 further comprising the step of providing a dielectric substrate such that said at least a pair of transmission lines are secured to said dielectric substrate.

37. The method of claim 33 further comprising the steps of:

providing a substrate such that said at least a pair of transmission lines are secured to said substrate; and tuning said substrate with a magnetic bias field such that a frozen mode of magnetic photonic materials is emulated.

38. The method of claim 33 further comprising the step of providing at least one inductive component and at least one capacitive component in at least one transmission line of said at least a pair of transmission lines to assist with mode control.

39. The method of claim 33 further comprising the step of capacitively coupling an antenna feed to said at least a pair of transmission lines.

* * * * *